United States Patent
Lombardo et al.

(10) Patent No.: US 6,541,777 B1
(45) Date of Patent: Apr. 1, 2003

(54) OPTICAL SENSING AND CONTROL OF ULTRAVIOLET FLUID TREATMENT DYNAMICS

(75) Inventors: Leo R. Lombardo, Lyndhurst, OH (US); Robert L. Jett, Twinsburg, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/548,197

(22) Filed: Apr. 13, 2000

Related U.S. Application Data

(63) Continuation-in-part of application No. 09/259,405, filed on Feb. 26, 1999, now Pat. No. 6,057,917.

(51) Int. Cl.[7] .................................................. G01J 1/00
(52) U.S. Cl. ..................... 250/435; 250/436; 250/455.1; 210/104; 210/138; 357/30; 357/32; 357/48; 257/184; 257/187
(58) Field of Search ............................... 250/435, 436, 250/455.1; 210/104, 138; 357/30, 32, 48; 257/184–187

(56) References Cited

U.S. PATENT DOCUMENTS

| | | | |
|---|---|---|---|
| 4,902,411 A | * | 2/1990 | Lin ............................ 210/104 |
| 5,130,776 A | * | 7/1992 | Popovic ........................ 357/30 |
| 5,257,496 A | | 11/1993 | Brown et al. |
| 5,303,684 A | | 4/1994 | Brown et al. |
| 5,394,005 A | | 2/1995 | Brown et al. |
| 5,467,185 A | | 11/1995 | Engeler et al. |
| 6,137,123 A | * | 10/2000 | Yang et al. .................. 257/184 |

* cited by examiner

*Primary Examiner*—John R. Lee
*Assistant Examiner*—Zia R. Hashmi
(74) *Attorney, Agent, or Firm*—Armstrong Teasdale LLP

(57) ABSTRACT

An ultra violet light sterilizing apparatus includes in one embodiment a fluid chamber, at least one ultraviolet light source configured to emit ultraviolet light into the fluid chamber, and at least one ultraviolet light sensor that includes a photodiode. The photodiode is a silicon carbide photodiode, a gallium nitride photodiode, or an aluminum gallium nitride photodiode. Each UV light sensor includes a sealed outer housing having an optically transparent window. The photodiode is located inside the housing adjacent the transparent window. Each UV light sensor also includes a signal amplification unit that includes an amplifier mounted on a printed circuit board located inside the housing. The UV sterilization apparatus also includes a controller configured to receive, as input, a signal from each ultraviolet light sensor. The controller compares the input signal to a desired UV light intensity and outputs a control signal to each ultraviolet light source to adjust the intensity of the ultraviolet light emitted from each ultraviolet light source.

20 Claims, 1 Drawing Sheet

OPTICAL SENSING AND CONTROL OF ULTRAVIOLET FLUID TREATMENT DYNAMICS

CROSS REFERENCE TO RELATED APPLICATIONS

This application is a continuation-in-part of U.S. patent application Ser. No. 09/259,405 filed Feb. 26, 1999 now U.S. Pat. No. 6,057,917.

BACKGROUND OF THE INVENTION

This invention relates generally to ultraviolet light treatment of fluids and more particularly, to optical sensing and control of ultraviolet light intensity levels in an ultraviolet light fluid treatment process with photodiode detectors.

Ultraviolet (UV) light may be used to sterilize water and other fluids. The ultraviolet light disrupts the DNA of microorganisms in the fluid, which prevents reproduction and thus kills the microorganisms. Regulation of UV light intensity is important in the UV light sterilization process because a minimum level of ultraviolet light intensity is typically required. Also, excessive levels of UV light intensity can result in high maintenance and an associated higher operation cost.

Photodiodes are sometimes used to detect and regulate UV light intensity in such sterilization processes. The UV light spectrum includes wavelengths from 10 to 400 nanometers (nm). However, typical photodiodes used to measure UV light in the known UV light sterilization processes are usually broad range wavelength detectors. For example, silicon detectors are used which are sensitive to light wavelengths ranging from 200 to 1100 nm. Gallium arsenide phosphide and gallium phosphide detectors, which are sensitive to light wavelengths ranging from 200 to 650 nm, are also used. These devices are inherently sensitive to visible and infrared light waves in addition to the UV spectrum. When only UV light detection is desired and outside light sources such as visible light are also present, erroneous signals may result.

Therefore, filters are needed to block out wavelengths longer than 400 nm to eliminate erroneous signals triggered by other light sources. However, filters are prone to degradation which can lead to permitting light out side the UV spectrum into the detector, which results in false and inaccurate readings. Additionally, filter degradation results in costly maintenance and/or equipment downtime.

It would be desirable to provide an ultraviolet light sterilization process incorporating a UV detector that is not sensitive to light outside the UV spectrum to eliminate erroneous signals caused by ambient light sources. It would further be desirable to provide an ultraviolet light sterilization process that does not depend upon light filters thereby lowering g maintenance costs and equipment downtime due to filter repair or replacement.

BRIEF SUMMARY OF THE INVENTION

In an exemplary embodiment, an ultra violet light sterilizing apparatus utilizing a photodiode sensor includes a silicon carbide (SiC) photodiode, a gallium nitride (GaN) photodiode, or an aluminum gallium nitride (AlGaN) photodiode. The ultraviolet light fluid sterilization apparatus includes a fluid chamber, at least one ultraviolet light source configured to emit ultraviolet light into the fluid chamber, and at least one ultraviolet light sensor that includes a photodiode.

Each UV light sensor includes a sealed outer housing having an optically transparent window. A silicon carbide photodiode, a gallium nitride photodiode, or an aluminum gallium nitride photodiode is located inside the housing adjacent the transparent window. The housing also includes at least one sealable outlet to permit electrical wire connections to pass into the housing. The optically transparent window may be fabricated from sapphire or quartz.

The UV light fluid sterilization a pparatus further includes a controller for sampling the signal from each ultraviolet light sensor. The controller compares the sampled signals to a desired UV light intensity and outputs a control signal to each ultraviolet light source to adjust the intensity of the ultraviolet light emitted from each ultraviolet light source.

In operation, fluid flows into the chamber of the ultraviolet light sterilization apparatus. The fluid is then irradiated with UV light from the ultraviolet light source. The UV light sensor measures the intensity of the UV light inside the chamber of the apparatus and the controller samples the signal generated by the sensor. Particularly, the photodiode senses the intensity of the UV light inside the chamber, the signal amplification unit amplifies the signal, and the controller samples the signal generated by the sensor. The controller ascertains any difference between the sensed UV intensity and a predetermined desired UV intensity. The controller then adjusts the intensity of the ultraviolet light source to correspond to the predetermined level of UV intensity.

The above described ultraviolet light fluid sterilization apparatus utilizes a UV detector that is not sensitive to light outside the UV spectrum and thus eliminates erroneous signals caused by ambient light sources. Particularly, the UV sensor has good UV sensitivity in the 200 to 300 nm band and is insensitive to infrared radiation above 400 nm. Also because the UV sensor is not sensitive to light having wavelengths greater than 400 nm, light filters are not required to filter ambient light.

DETAILED DESCRIPTION OF THE INVENTION

Figure 1:
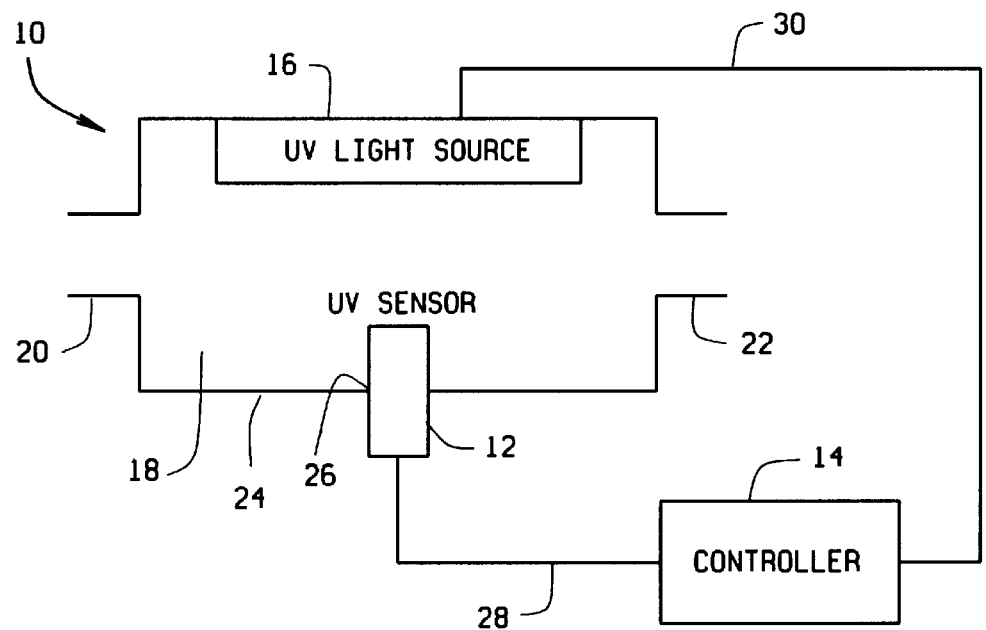
FIG. 1 is a schematic view of an ultraviolet light fluid sterilization apparatus in accordance with one embodiment of the present invention.

FIG. 1 is a schematic view of an ultraviolet light fluid sterilization apparatus 10 in accordance with an embodiment of the present invention. Apparatus 10 sterilizes or disinfects various fluids, for example, water, by delivering concentrated doses of ultraviolet energy to the fluid. The ultraviolet energy, also called UV light, disrupts the DNA of microorganisms in the fluid preventing reproduction and thus killing the microorganisms. Of course, apparatus 10 is suitable for sterilizing other fluids besides water, for example, compressed air, oils, blood, and other body fluids. To successfully sterilize a fluid, a minimum level of ultraviolet light intensity is required. Apparatus 10 includes an ultraviolet light sensor 12 to measure UV light intensity and a controller 14 to ascertain any difference between the sensed UV intensity and a predetermined desired intensity and to adjust the output of an ultraviolet light source 16 to achieve the desired level of UV light intensity.

Apparatus 10 also includes a chamber 18 having an inlet 20 and an outlet 22. Chamber 18 is a tube through which the fluid may continuously flow. Alternatively, chamber 18 may be a tank which permits a longer dwell time of the fluid in chamber 18. A tank permits batch processing of the fluid, while a tube generally is used for continuous processing of the fluid as it flows through chamber 18.

UV light source 16 is located inside chamber 18. However, UV light source 16 may be located outside chamber 18 adjacent an opening or window in chamber 18 that permits the UV light emitted from light source 16 to enter chamber 18.

UV light sensor 12 is mounted on a wall 24 of chamber 18. Particularly, sensor 12 extends through an opening 26 in wall 24 so that at least a portion of sensor 12 is located inside chamber 18. However in an alternative embodiment, UV light sensor 12 may be mounted outside chamber 18 adjacent an opening or window permitting UV light to pass from inside chamber 18 to sensor 12.

UV light sensor 12 and UV light source 16 are each electrically connected to controller 14. Particularly, sensor 12 is coupled to controller 14 by a controller input line 28. UV light source 16 is coupled to controller 14 by a controller output line 30.

Figure 2:
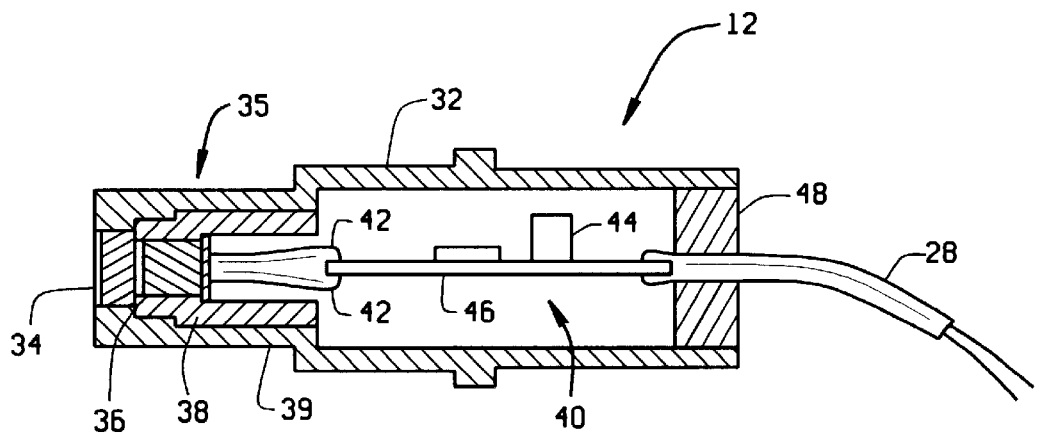
FIG. 2 is a sectional side view of the ultraviolet light sensor shown in FIG. 1.

FIG. 2 is a sectional side view of ultraviolet light sensor 12. UV sensor 12 includes a sealed housing 32. An optically transparent window 34 is located in a first end 35 of housing 32. Optically transparent window 34 permits UV light to enter housing 32. Window 34 may be fabricated from any suitable material, for example sapphire or quartz. A photodiode 36 is located inside housing 34 adjacent to window 34. Photodiode 36 is a silicon carbide photodiode, a gallium nitride photodiode, or an aluminum gallium nitride photodiode. A SiC photodiode 36 is sensitive to light of about 200 to about 400 nm wavelength which is within the UV spectrum of about 10 to 400 nm. A SiC Photodiode 36 is not sensitive to infrared and visible light having wavelengths greater than 400 nm.

A GaN photodiode 36 is sensitive to light of about 190 to 365 nm. With a GaN photodiode 36, sensor 12 sensitivity peaks at approximately the limit of 365 nm and then experiences an abrupt cut-off in sensitivity. This feature enhances the functionality of UV sensor 12 in that any light above 365 nm wavelength is ignored.

Adding aluminum to the gallium nitride substrate to form an AlGaN photodiode 36 permits a shift in the cut-off wavelength of the GaN photodiode depending on the mole composition of aluminum and gallium in the photodiode. Particularly, for a photodiode fabricated from a material having the formula $Al_XGa_{1-X}N$, where X is defined as a mole composition having a value from 0 to 1, the cut-off wavelength depends on the value of X. For example, with a value of X=1, the resulting photodiode is an AlN photodiode with a cut-off wavelength of 200 nm. With a value of X=0, the resulting photodiode is a GaN photodiode with a cut-off wavelength of 365 nm. With a value of X between 0 and 1, the resulting photodiode is an AlGaN photodiode having a cut-off wavelength between 200 and 365 nm depending on the value of X. Specifically, as the value of X approaches 0, the cut-off wavelength of the photodiode approaches 365 nm.

Because photodiode 36 is not sensitive to light outside the UV spectrum, stray ambient light entering chamber 18 (shown in FIG. 1) will not cause erroneous readings by sensor 12 of the UV light intensity inside chamber 18. A TEFLON® (polytetrafluoroethylene) plastic insert 38, configured to fit inside first end 35 of housing 32 and engage wall 39 of housing 32, holds photodiode 36 in place adjacent window 34.

Sensor 12 also includes a signal amplification unit 40 electrically connected to photodiode 36 by conductors 42. Signal amplification unit 40 includes a signal amplifier 44 mounted on a printed circuit board 46. Circuit board 46 is mounted inside housing 32. Conductors 42 are electrically connected to signal amplifier 44 through printed circuit board 46. Controller input line 28 enters housing 32 through a sealable inlet 48. Controller input line 28 is electrically connected to signal amplifier 44 through printed circuit board 46. In an alternate embodiment, signal amplification unit 40 is located outside and separate from housing 32.

In operation, fluid flows into chamber 18 of ultraviolet light sterilization apparatus 10. The fluid is then irradiated with UV light from ultraviolet light source 16. UV light sensor 12 is responsive to the intensity of the UV light inside chamber 18. Particularly, photodiode 36 generates a signal representative of the intensity of the UV light inside chamber 18. The generated signal is amplified by signal amplifier 44 of signal amplification unit 40, and controller 14 samples the amplified signal on input line 28. Controller 14 ascertains any difference between the sensed UV intensity and a predetermined desired UV intensity. Controller 14 then sends a control signal through controller output line 30 to adjust the intensity of ultraviolet light source 16 to correspond to the predetermined UV intensity level. For example, if the sensed UV intensity inside chamber 18 is below the desired UV intensity, controller 14 causes UV light source 16 to increase UV light output.

The above described ultraviolet light fluid sterilization apparatus 10 utilizes UV sensor 12 that is not sensitive to light outside the UV spectrum. Because sensor 12 is not sensitive to light outside the UV spectrum, there are no erroneous signals from sensor 12 caused by ambient light sources. Erroneous signals from sensor 12 could cause controller 14 to adjust the UV intensity too low for proper sterilization. By elimination of erroneous UV intensity signals, photodiode sensor 12 ensures that UV light sterilization apparatus 10 operates efficiently to produce safe sterilized fluids. Additionally, varying mole compositions of aluminum and gallium in an AlGaN photodiode can change the cut-off wavelength to a specific wavelength which permits customizing sensor 12 for an intended application. Further, because photodiode sensor 12 is not sensitive to light outside the UV spectrum, the use of light filters to eliminate ambient light is not required.

While the invention has been described in terms of various specific embodiments, those skilled in the art will recognize that the invention can be practiced with modification within the spirit and scope of the claims.

What is claimed is:

1. An ultraviolet light sensor device for a fluid sterilizing apparatus including a UV light source, said sensor device comprising:

an ultraviolet light sensitive photodiode, said photodiode capable of generating a signal proportional to the intensity of ultraviolet light generated by the UV light source and detected by said photodiode, said photodiode comprised of a material having the formula $Al_XGa_{1-X}N$, where X has a value from 0 to 1; and a sealed outer housing comprising an optically transparent window, said photodiode located inside said housing and adjacent said transparent window.

2. An ultraviolet light sensor device in accordance with claim 1 further comprising a signal amplification unit coupled to said photodiode.

3. An ultraviolet light sensor device in accordance with claim 2 wherein said signal amplification unit comprises an amplifier mounted on a printed circuit board, said printed circuit board located inside said housing.

4. An ultraviolet light sensor device in accordance with claim 1 wherein said photodiode is sensitive to light having a wavelength ranging from about 190 to about 365 nanometers.

5. An ultraviolet light sensor device in accordance with claim 1 wherein said optically transparent window comprises sapphire or quartz.

6. An ultraviolet light sensor device in accordance with claim 1 wherein said housing further comprises at least one sealable outlet to permit electrical wire connections to pass through said housing.

7. An ultraviolet light fluid sterilization apparatus comprising:

a fluid chamber:

at least one ultraviolet light source configured to emit ultraviolet light into said fluid chamber; and at least one ultraviolet light sensor comprising a photodiode, said photodiode comprised of a material having the formula $Al_XGa_{1-X}N$, where X has a value from 0 to 1, said photodiode configured to generate a signal proportional to the intensity of ultraviolet light generated by said UV light source and detected by said photodiode.

8. An apparatus in accordance with claim 7 wherein said ultraviolet light sensor further comprises:

a sealed outer housing comprising an optically transparent window, said photodiode located inside said housing and adjacent said transparent window; and a signal amplification unit coupled to said photodiode.

9. An apparatus in accordance with claim 8 wherein said signal amplification unit comprises an amplifier.

10. An apparatus in accordance with claim 9 wherein said amplifier is mounted on a printed circuit board, said printed circuit board located inside said housing.

11. An apparatus in accordance with claim 7 wherein said photodiode is sensitive to light having a wavelength ranging from about 190 to about 365 nanometers.

12. An apparatus in accordance with claim 7 wherein said optically transparent window comprises sapphire or quartz.

13. An apparatus in accordance with claim 7 wherein said housing further comprises at least one sealable outlet to permit electrical wire connections to pass through said housing.

14. An apparatus in accordance with claim 13 further comprising a controller configured to receive, as input, a signal from said ultraviolet light sensor and to output a control signal to said ultraviolet light source to control the intensity of the ultraviolet light emitted from said ultraviolet light source.

15. A method of sterilizing a fluid utilizing an ultraviolet light fluid sterilization apparatus, the sterilization apparatus comprising a fluid chamber, at least one ultraviolet light source, and at least one ultraviolet light sensor, each ultraviolet light source configured to emit ultraviolet light into the fluid chamber, and each ultraviolet light sensor comprising a photodiode, the photodiode comprised of a material having the formula $Al_XGa_{1-X}N$, where X has a value from 0 to 1 and configured to generate a signal proportional to the intensity of ultraviolet light generated by the UV light source and detected by the photodiode, said method comprising the steps of:

flowing a fluid into the chamber of the ultraviolet light sterilization apparatus;

irradiating the fluid with ultraviolet light from the at least one ultraviolet light source of the sterilization apparatus;

sampling a signal generated by the ultraviolet light sensor with the controller; and adjusting the level of ultraviolet light intensity in the chamber based on the sampled signal and with an output signal from the controller to the light source.

16. A method in accordance with claim 15 wherein each ultraviolet light sensor further comprises:

a sealed outer housing comprising an optically transparent window, the photodiode located inside the housing and adjacent the transparent window; and a signal amplification unit.

17. A method in accordance with claim 16 wherein signal amplification unit comprises an amplifier mounted on a printed circuit board, the printed circuit board located inside the housing.

18. A method in accordance with claim 16 wherein the photodiode is sensitive to light having a wavelength ranging from about 190 to about 365 nanometers.

19. A method in accordance with claim 16 wherein the optically transparent window comprises sapphire or quartz.

20. A method in accordance with claim 16 wherein said housing further comprises at least one sealable outlet to permit electrical wire connections to pass through said housing.

* * * * *